(12) United States Patent
Rajakarunanayake

(10) Patent No.: US 6,657,994 B1
(45) Date of Patent: Dec. 2, 2003

(54) UNINTERRUPTED TRANSFER OF VOICE TELEPHONY SERVICE TO DERIVED VOICE TECHNOLOGY

(75) Inventor: Yasantha N. Rajakarunanayake, San Ramon, CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 0 days.

(21) Appl. No.: 09/383,167

(22) Filed: Aug. 25, 1999

(51) Int. Cl.[7] .............................................. H04L 12/66
(52) U.S. Cl. .............. 370/352; 379/221.01; 379/220.01
(58) Field of Search ................................ 370/350, 352, 370/353, 354, 389, 395.2, 395.21, 395.41, 410, 419; 379/220, 221, 219

(56) References Cited

U.S. PATENT DOCUMENTS

| | | | | |
|---|---|---|---|---|
| 5,912,963 A | * | 6/1999 | Begeja | 379/221 |
| 6,064,727 A | * | 5/2000 | Levy | 379/221 |
| 6,118,777 A | * | 9/2000 | Sylvain | 370/351 |
| 6,335,936 B1 | * | 1/2002 | Bossemeyer | 370/420 |
| 6,453,033 B1 | * | 9/2002 | Little | 379/219 |
| 6,470,074 B2 | * | 10/2002 | Teixeria | 379/32.04 |

\* cited by examiner

Primary Examiner—Douglas Olms
Assistant Examiner—Ricardo M. Pizarro
(74) Attorney, Agent, or Firm—Jung-hua Kuo

(57) ABSTRACT

Systems and methods for providing uninterrupted transfer of voice telephony provided by a first service provider to a derived voice technology over a digital subscriber line provided by a second service provider are disclosed are disclosed. The system generally comprises a first telephone line configured to connect to a first and a second voice switch of the first and second service providers, respectively, having a same assigned telephone number and a derived voice customer premise equipment configured to connect to the first and second telephone lines and to selectively connect a telephone to the second voice switch. The method generally comprises establishing connectivity between a telephone and a first and a second voice switch of the first and second service providers via a first and a second line, respectively, having a same assigned telephone number and selectively connecting the telephone to the second voice switch via a client premise equipment.

17 Claims, 5 Drawing Sheets

AFTER CUT OVER

UNINTERRUPTED TRANSFER OF VOICE TELEPHONY SERVICE TO DERIVED VOICE TECHNOLOGY

BACKGROUND OF THE INVENTION

1. Field of the Invention

The present invention relates generally to voice telephony using derived voice technology. More specifically, systems and methods for providing uninterrupted transfer of voice telephony to a derived voice technology such as over a digital subscriber line are disclosed.

2. Description of Related Art

Voice over asynchronous transfer mode ("VoATM") technology (or voice over digital subscriber line technology, "VoDSL") technology is increasingly being utilized to provide derived, multiple voice line capabilities over a digital subscriber line ("DSL") operating over twisted pair copper phone lines. VoATM technology involves digital transmission of voice conversations over ATM networks whereas voice conversations are traditionally carried over analog phone lines. Typically, the VoATM process involves segmenting a synchronous voice signal into cells, each cell with its own header, and interleaving the cells into the ATM network with cells from other sources, and eventually delivering the cell packets to their destination where they are converted back into a synchronous data stream. Specifically, single-line or symmetric DSL (SDSL) loops work particularly well for VoATM. SDSL offers in a single 2-wire implementation, a symmetric data rate of up to 1.1 Mbps or 1.544 Mbps with recent improvements.

To provide derived voice service to a customer premise, a derived voice customer premise equipment ("DV-CPE") capable of providing multiple voice lines over a single DSL line may be provided. Voice signals are delivered from a telephone between the DV-CPE and a central office ("CO") over the DSL line. The CO is in turn connected to a voice gateway over an ATM network. The voice gateway is connected to a Class-5 voice switch which is in turn connected to a public switched telephone network ("PSTN") over a GR-303 interface. Thus, Vo-ATM can provide connectivity from the DV-CPE to the voice gateway over the ATM network and to the PSTN over the GR-303 interface.

DV-CPEs are typically connected over ATM virtual circuits ("VCs") to the voice gateway. The voice gateway may be common to a metropolitan area. Examples of virtual circuits include permanent virtual circuit ("PVC"), soft or smart PVC ("SPVC"), and switched virtual circuit ("SVC").

With Vo-ATM technology over DSL, a single DSL line to a client or subscriber is capable of supporting multiple derived voice lines on a single PVC. Each port of a DVCPE can be activated and configured to provide dial tone from the voice switch by in-band provisioning over DSL. In particular, DV-CPEs may enable up to 16 telephone lines and high-speed Internet access to be delivered over a single DSL connection. The DV-CPE may provide a plurality of standard analog plain old telephone service ("POTS") ports allowing connections for telephones, facsimile machines, and modems. The ports may support features such as caller ID, call waiting, and messaging features. In addition, the DV-CPE may include a router to provide bridging and Internet Protocol ("IP/IPX") routing to support applications for high-speed Internet and corporate access. FlowPoint™ 2200V Integrated Access Device ("IAD") provided through FlowPoint Corporation, Los Gatos, Calif., is an example of a CPE device suitable for providing digitized voice features and high-speed Internet and corporate data access over a DSL line.

Incumbent local exchange carriers ("ILECs") and competitive local exchange carriers ("CLECs") can both provide derived voice services over DSL. The dial-tone of each telephone may be provided by the voice switch of an ILEC or CLEC via the DV-CPE. However, if a customer switches telephone service from an analog or derived voice service provided by one LEC, whether by an ILEC or a CLEC, to a derived voice service provided by another LEC, interruptions in the telephone service may result during the switch over process.

Interruptions in the telephone service during the switch over process may result from the asynchronous or non-simultaneous occurrence of the various steps of the switch over process. One step in the switch over process is line number porting ("LNP") from one LEC to another LEC where the same telephone number is kept. LNP from the ILEC to the CLEC may be accomplished with database updates at the ILEC and CLEC switches or at the PSTN. Another step in the switch over process is the wire cross connect at the client premise from the original voice service loop to the new voice service loop via the DV-CPE. Thus, interruptions in the telephone service during the switch over process may result from the asynchronous or non-simultaneous occurrence of the LNP and the wire cross connect at the client premise.

In order to minimize possible telephone service interruptions, the client may need to maintain an existing telephone connected to the old voice service line while providing another telephone connected to the DV-CPE for the new voice service line in order to minimize service interruptions. With telephones connected to both the old voice service line and the new voice service line, the client would not necessarily know which telephone to use to make an outgoing telephone call. In addition, the client would need to discern which telephone is ringing when an incoming call arrives. Further, such a configuration also complicates the switchover process.

Therefore, it is desirable to provide a smooth switchover of voice service providers, a hot cut-over, dial-number portability and continuous telephone service in the actual cut-over from a voice line owned by one LEC, such as an ILEC or CLEC, to a derived voice line over a DSL line owned by another LEC.

SUMMARY OF THE INVENTION

Systems and methods for providing uninterrupted transfer of voice telephony provided by a first service provider to a derived voice technology over a digital subscriber line provided by a second service provider are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In a preferred embodiment, the system generally comprises a first telephone line configured to connect to a first and a second voice switch of the first and second service providers, respectively, having a same assigned telephone number, and a DV-CPE configured to connect to the first and second telephone lines and configured to selectively connect a telephone to the second voice switch.

In another preferred embodiment, the method generally comprises establishing connectivity between a telephone and a first and a second voice switch of the first and second service providers via a first and a second line, respectively, having a same assigned telephone number and selectively connecting the telephone to the second voice switch via a client premise equipment.

In yet another preferred embodiment, the method generally comprises connecting a derived voice customer premise equipment to a first and a second line coupled to a first and a second voice switch of the first and second service provider, respectively, and disconnecting service from the first service provider, where the derived voice CPE is configured to selectively connect a telephone to the second voice switch prior to the disconnecting and the CPE connects the telephone to the second voice switch after the disconnecting.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for providing uninterrupted transfer of voice telephony to a derived voice technology are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may have not been described or shown in detail so as not to unnecessarily obscure the present invention.

Figure 1:
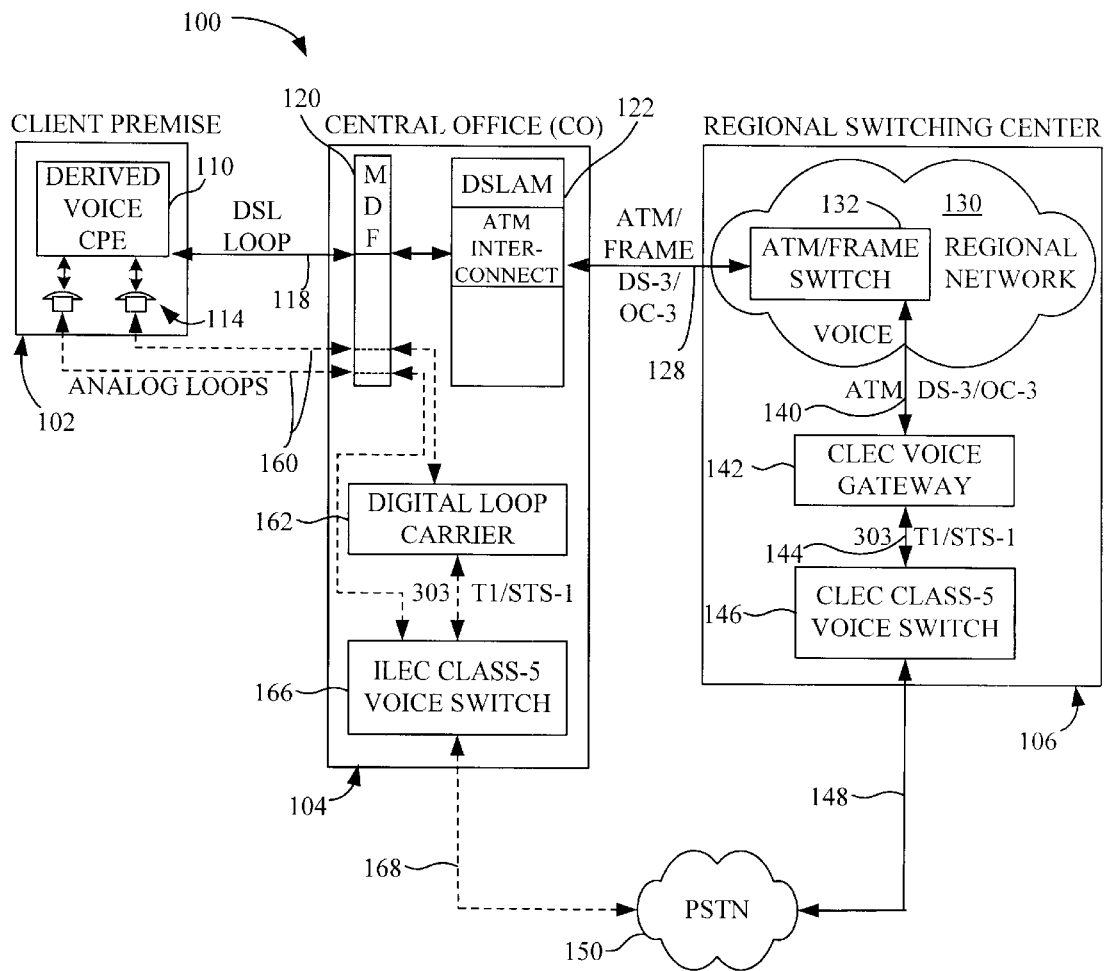
FIG. 1 is a block diagram illustrating a VoATM network and an analog voice service network.

An overview and background of a typical architecture of a VoATM network will be presented with reference to FIG. 1, which will serve as a basis for subsequent discussions of the systems and methods for providing uninterrupted transfer from one voice telephony service to a derived voice telephony service. FIG. 1 shows a block diagram illustrating a typical architecture of a VoATM packet network as well as an analog base-band voice circuit network 100. The interconnections between components of the VoATM packet network are shown with solid lines while the interconnections between components of the analog base-band voice circuit network are shown with dashed lines. The VoATM packet network will be described first and followed by a description of the analog base-band voice circuit network.

The VoATM architecture generally comprises connections among equipment at a client premise 102, a switching station or a central office ("CO") 104, and a regional switching center 106. A DV-CPE 110 is provided at the client premise 102 to which one or more telephones, facsimile machines, or modems 114 may be connected to one or more voice ports of the DV-CPE 110.

The DV-CPE 110 at the client premise 102 is connected to a DSL link or loop 118 over a twisted pair of copper phone lines which are in turn connected to a main distribution frame ("MDF") 120 in the central office 104. The MDF 120 simply serves to aggregate various twisted pairs of copper phone lines from various client premises within a certain geographical region.

The twisted pairs of copper phone lines running DSL loops are connected to a DSL access multiplexer ("DSLAM") 122 via the MDF 120. The DSLAM includes a plurality of ATM interconnect ports for implementing ATM methodologies to which the DSL loop 118 is connected. For example, one of the ATM interconnect ports may be an SDSL port to which the DSL loop 118 may be connected. Thus, signals delivered and sent via the DSL loop 118 to and from the client premise 102 are multiplexed through DSLAM 122.

Traffic from a number of central offices may be aggregated on a regional network 130 in a regional switching center 106. The DSLAM 122 of the central office 104 connects to an ATM/Frame switch 132 in the regional network 130 via a Time Division Multiplexed ("TDM") link 128, such as a DS-3 or STS-3 c. In other words, the DSLAM 122 multiplexes multiple DSL lines onto a high-capacity transmission line for providing an ATM protocol connection between the DSL lines and the ATM/Frame network switch 132.

The ATM/Frame switch 132 delivers voice signals over a DS-3/OC-3 interface 140 between the ATM/Frame switch 132 and a voice gateway 142. DS-3 is digital signal level 3 within a digital transmission speed category that may be used on T3 systems and transmits at 44.736 Mbps. DS-3 is primarily used in Northern America and Japan. OC-3 is optical carrier level 3 having a rate of 155.52 Mbps and is one of a series of transport levels defined in conjunction with synchronous optical network ("SONET"). As is evident, other suitable signal and signal carrying systems such as European's E-system, similar to the DS-3, may be utilized and the particular system utilized may depend upon the signal and signal carrying systems used in a locale.

Voice signals may be further transmitted over a link such as a T1/STS-1 link 144 between the voice gateway 142 and a Class-5 voice switch 146. T1 is a communications carrier transmission system and the STS-1 is a synchronous transport signal level 1. Finally, voice signals may be transmitted over a GR-303 interface 148 between the Class-5 voice switch 146 and a public switched telephone network ("PSTN") 150. The voice gateway 142, the Class-5 voice switch 146, the PSTN 150, and their interconnections 146, 148 are well known in the art and are not discussed in further detail for purposes of clarity.

Although not shown, a plurality of COs within a geographical region are typically connected to a single regional switching center. A local network of COs and regional switching center includes interconnections between the regional switching center and each of the plurality of COs. Each CO is in turn connected to a plurality of client premises.

Typically, an incumbent local exchange carrier ("ILEC") owns and operates the COs and the lines between the COs and the client premises. Competitive local exchange carriers ("CLECs") typically do not own any traditional voice equipment in the telephone company COs nor the lines between the COs and the client premises but generally lease lines between the COs and the client premises.

The local network may be provided within the geographical region to enable a CLEC to have immediate broad coverage within the community. In particular, for each geographical region in which the CLEC wishes to provide service, the CLEC may locate a CLEC regional switching center at a central location within the geographical region and run or lease fiber facilities from the CLEC regional switching center to each of the ILEC COs within the community. Further, the CLEC need only provide one voice gateway and one Class-5 switch for each CLEC regional switching center rather than for each CO, as the ILEC currently provides.

Because an ATM network is a distributed network, only one CLEC regional switching center needs to be provided by a particular CLEC for hundreds of COs. For example, in the San Francisco Bay Area, only one or two regional switching centers for each CLEC need to be provided to interconnect all the COs in the entire geographical region.

Although the telephones 114 have been described as being connected to the VoATM packet network via the DSL loop 118 and the DV-CPE 110, the telephones 114 may alternatively be connected to the analog base-band voice circuit network. Although the DSL loop 118 and the analog loops 160 are shown as physically separate components, it is to be understood that one of the analog loops 160 may be enabled over the same pair of twisted copper telephone lines as the DSL loop 118, either exclusively, i.e., at different times, as in the case of SDSL technology, for example, or simultaneously as in the case of ADSL or G.Lite technology, for example.

The analog loops 160 are in turn connected to the MDF 120 in the CO 104. The analog voice loop may be a typical base-band analog voice loop such that no special equipment other than a conventional telephone jack and a conventional telephone are needed. The telephone line may be connected to a digital loop carrier ("DLC") 162 via the MDF 120. The ILEC DLC 162 may be connected to an ILEC Class-5 voice switch 166 via a link such as a T1/STS-1 link 164. Alternatively, a given telephone line may be connected directly to the ILEC Class-5 voice switch 166. Finally, voice signals may be transmitted over a GR-303 interface 168 between the ILEC Class-5 voice switch 166 and the public switched telephone network ("PSTN") 150.

Figure 2:
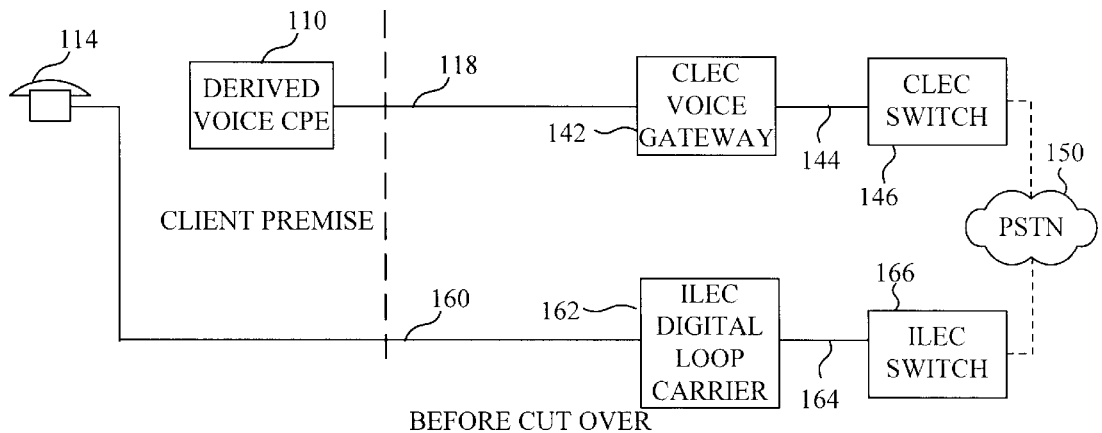
FIG. 2 is a simplified block diagram illustrating interconnections of a telephone prior to a cut over from an original voice line provided by one LEC to a new VoATM voice line provided by another LEC and via a derived voice CPE.

FIG. 2 is a simplified block diagram illustrating interconnections of a telephone 114 prior to a cut over of analog or derived voice telephone service provided one LEC to a derived voice service provided by another LEC. For purposes of clarity, the discussion assumes that the original telephone service is an analog voice telephone service provided an ILEC and that the new telephone service is a derived voice service provided by a CLEC. However, other schemes may be implemented such as a switch over from a telephone service provided by a CLEC to telephone service provided by another CLEC or even an ILEC.

As shown in FIG. 2, prior to the cut over, the telephone 114 is connected to the ILEC DLC 162 via the base-band analog loop 160 over the twisted pair copper lines. The ILEC DLC 162 is connected to the ILEC switch 166 via a link 164. Prior to establishing derived voice service to the telephone 114 via the DSL loop 118, neither the connection between the CLEC switch 146 and the CLEC voice gateway 142 nor the connection between the CLEC voice gateway 142 and the DV-CPE 110 is established yet. However, in the process of establishing derived voice service, the DV-CPE 110 may be installed in the client premise. In addition, the connections between the CLEC switch 146 and the CLEC voice gateway 142 and between the CLEC voice gateway 142 and the DV-CPE 110 may be established.

The lines between the CLEC switch 146 and the PSTN 150 and between the ILEC switch 166 and the PSTN 150 merely illustrate that the two switches both connect to the PSTN as described above. In addition, as shown, the analog loop 160 and the DSL loop 118 are generally enabled over different pairs of twisted copper telephone line.

Figure 3:
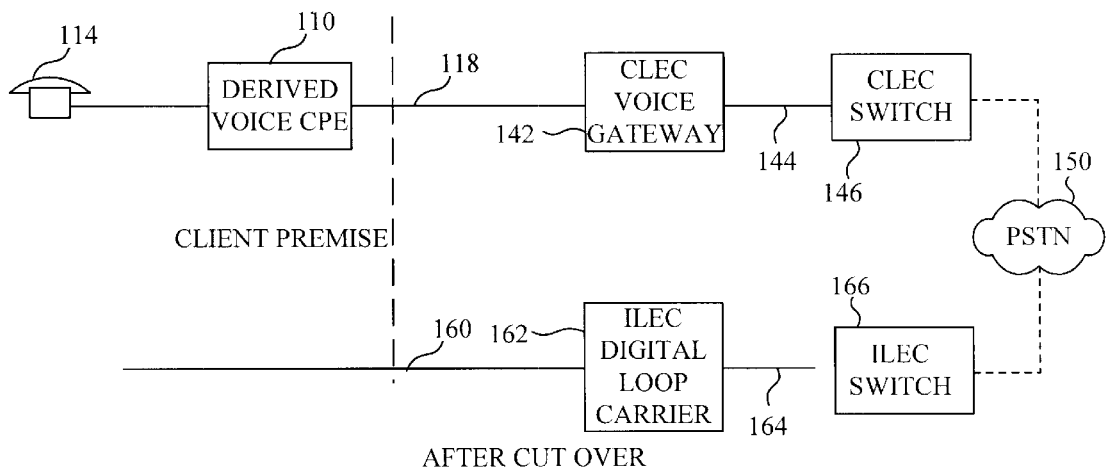
FIG. 3 is a simplified block diagram illustrating interconnections of the telephone after the cut over from the original voice line provided by one LEC to the new VoATM voice line provided by another LEC via the derived voice CPE.

FIG. 3 is a simplified block diagram illustrating interconnections of the telephone 114 after the cut over from the analog voice service provided by the ILEC to the derived voice service provided by the CLEC. As shown in FIG. 3, after the cut over, the link 164 between the ILEC switch 166 and the ILEC DLC 162 is broken. Thus, the client telephone 114 is no longer connected to the ILEC switch 166 via the ILEC DLC 162 and the base-band analog loop 160. Rather, after the cut over, the derived voice CPE 110 connects the telephone 114 to the CLEC voice gateway 142 via DSL loop 118 and to the CLEC switch 146 via the link 144.

As described above, during the cut over, the client may be without telephony service if the cut over is not properly coordinated or synchronized among the LNP from the ILEC and to the CLEC if the same phone number is used, the disconnecting of telephony service by the ILEC, the establishment of telephony service by the CLEC, and the wire cross connect from the ILEC analog loop to DSL loop via the DV-CPE at the client premise. Interruptions in voice telephony service may result where the same or new phone number.

Where the same phone number and the different twisted pair copper lines are used, the LNP, the disconnecting of telephony service by the ILEC, the establishment of telephony service by the CLEC, and the wire cross connect from the ILEC analog loop to DSL loop via the DV-CPE at the client premise all must be coordinated and synchronized in order to prevent telephony service interruptions. If the LNP from the ILEC to the CLEC occurs prior to or after the wire cross connect from the ILEC analog loop to DSL loop via the DV-CPE at the client premise, for example, interruptions to the telephony service at the client premise would result. Similarly, if the LNP is completed prior to the disconnecting of the telephony service by the ILEC and/or prior to the establishment of telephony service by the CLEC, interruptions to the telephony service at the client premise would also result. Of course, these are merely examples and there are numerous other examples of situations where interruptions to the telephony service at the client premise would result.

Figure 4:
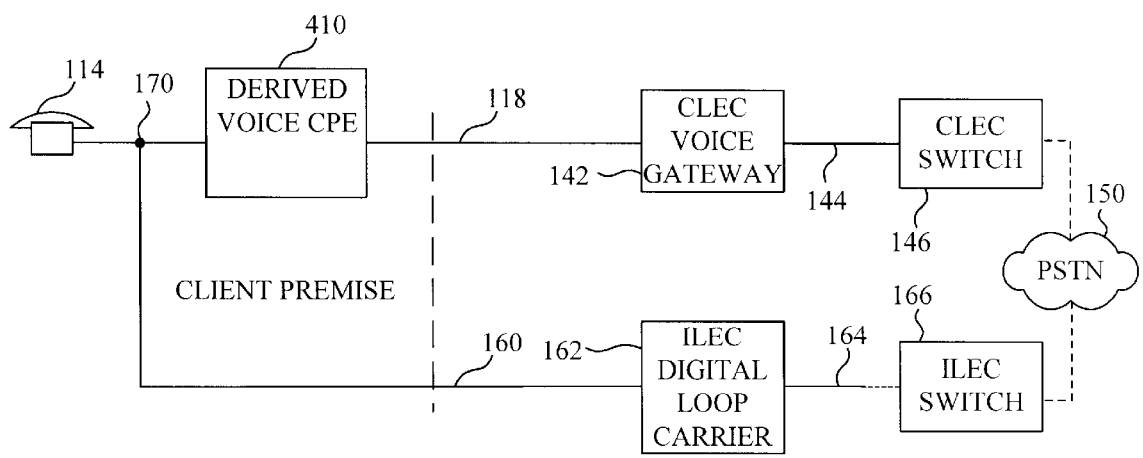
FIG. 4 is a simplified block diagram illustrating interconnections of the telephone prior to the cut over from the original voice line provided by one LEC to the new VoATM voice line provided by another LEC via a modified derived voice CPE.

FIG. 4 is a simplified block diagram illustrating interconnections of the telephone with the original voice telephony service provided by the ILEC and the new VoATM voice telephony service provided by the CLEC via a modified DV-CPE 410 over different pairs of twisted copper wiring and using the same assigned telephone number. The system shown in FIG. 4 is configured to minimize or prevent voice telephony service interruptions when the client switches between two LECs.

As shown in FIG. 4, the telephone 114 is connected to a modified derived voice CPE 410 even prior to the cut over. In addition, both the telephone 114 and the DV-CPE 410 are connected to the base-band analog loop 160 via a splitter 170.

Prior to the LNP, incoming calls are directed from the PSTN 150 to the telephone 114 via the ILEC switch 166, the ILEC DLC 162, and the base-band analog loop 160. In addition, prior to the cutting-off of telephony service by the ILEC, dial tone is provided to the telephone 114 from the ILEC via the base-band analog loop 160. However, after the LNP but prior to the cut-off by the ILEC, the DV CPE 410 enables incoming calls to be routed through the CLEC and the modified derived voice CPE 410 and enables the dial tone and the outgoing calls to be routed through the ILEC via the base-band analog loop 160.

The modified derived voice CPE 410 can passively monitor the activities on the base-band analog loop 160. In particular, the modified derived voice CPE 410 detects on-hook and off-hook transitions on the voice port of the modified DV-CPE 410. Upon detection of the off-hook state, e.g. when a receiver of the telephone 114 is picked up, the modified DV-CPE 410 listens for a dial tone provided by the ILEC. If the modified derived voice CPE 410 detects a dial tone provided via the analog loop 160 within a predetermined time period, such as 0.5 seconds, for example, then the DV-CPE 410 does not connect the telephone 114 to the DSL loop 118 such that an outgoing call may be placed via the analog loop 160, bypassing the derived voice functionality of the DV-CPE 414 and the DSL loop 118. As is known in the art, prior to cutting-off of the telephony service by the ILEC, the ILEC is still providing dial tone to the telephone 114 via the analog loop 160.

Alternatively, if the modified derived voice CPE 410 does not detect a dial tone provided by the analog loop 160 within the predetermined time period, then the modified derived voice CPE 410 connects the telephone 114 to the DSL loop 118. An outgoing call may then be placed via the DSL loop 118 and the CLEC, using the derived voice functionality of the DV-CPE 414. As is known in the art, after the cutting-off of telephony service by the ILEC, the ILEC no longer provides dial tone to the telephone 114 via the analog loop 160. Rather, the CLEC now provides dial tone to the telephone 114 via the DSL loop 118.

The DV CPE 410 is optionally configured such that the CLEC serves as the primary telephony service provider while the ILEC serves as the secondary telephony service provider prior to the completion of the cut-over, i.e. either one or both of the incoming and outgoing calls are routed through the ILEC and the analog loop 160. The DV CPE 410 is also optionally configured such that the ILEC serves as the primary telephony service provider while the CLEC serves as the secondary telephony service provider after the completion of the cut-over, i.e. both the incoming and outgoing calls are routed through the CLEC and the DSL loop 118

With the CLEC as a secondary telephony service provider prior to the completion of the cut-over, the DV-CPE 410 allows the CLEC to provide dial tone only when the ILEC fails to providing the dial tone upon detection of an off-hook state of the telephone 114. As is evident, with the modified DV-CPE 410, the telephone 114 may be connected to two or more voice telephony services, e.g., both the ILEC and the CLEC, such that the cut-over process can be nearly transparent to the user and is generally done with uninterrupted telephony service.

Thus, the modified DV-CPE 410 allows a scenario where the ILEC has not terminated its voice telephony service to the telephone 114 at the client premise and the CLEC has already established voice telephony service to the telephone 114. In such as case, the CLEC provides a dial tone only upon failure of the ILEC to provide the dial tone. In addition, incoming calls can be routed either through the ILEC or the CLEC, depending upon whether LNP from the ILEC to the CLEC has occurred, to the same telephone 114.

It is to be understood that although the embodiments are described in terms of a DSL loop in conjunction with a modified DV-CPE using DSL technology, principles of the configuration and methodology may be adapted for use with in other derived voice technologies such as IP-Telephony (Voice over IP), voice over frame relay, and Ether-phones.

Figure 5:
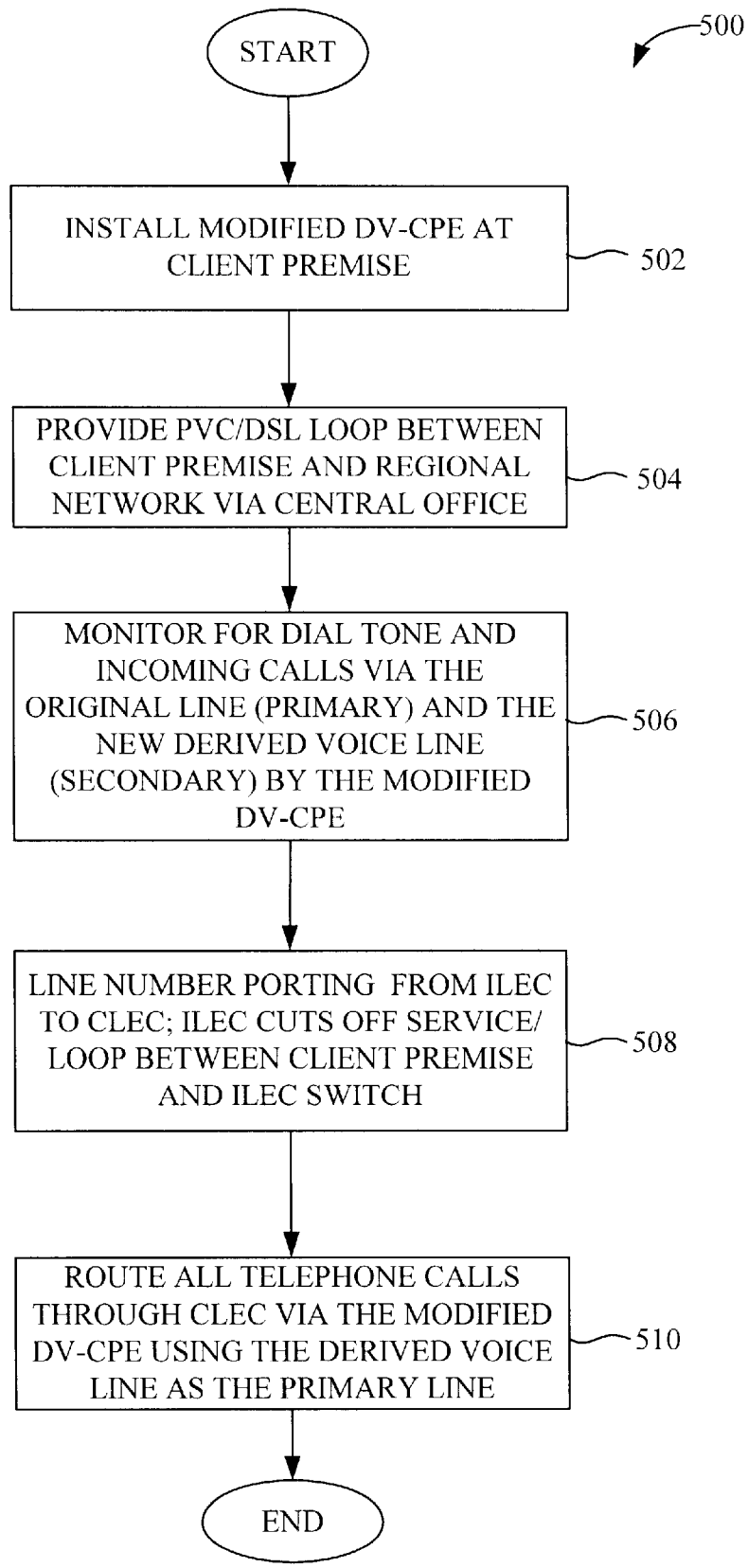
FIG. 5 is a flow chart illustrating a process for providing uninterrupted transfer from one voice telephony service provided by one LEC to a derived voice telephony service provided by another LEC.

FIG. 5 is a flow chart illustrating a process 500 for providing uninterrupted transfer of voice telephony service provided by one LEC such as an ILEC to a derived voice telephony service provided by another LEC such as a CLEC. At step 502, a modified derived voice CPE is installed at the client premise. The functionality of the modified derived voice CPE is described above with reference to FIG. 4.

At step 504, a PVC/DSL loop between the client premise and the ATM/frame switch at the regional network via an ATM interconnect port of the DSLAM at the central office is provided. At this point, although the CLEC may have established derived voice service to the client premise, the ILEC may not have terminated voice telephony service to the client premise and/or the LNP from the ILEC to the CLEC may not have occurred yet.

At step 506, as both outgoing and incoming telephone calls are routed through the ILEC and/or the CLEC via the modified DV-CPE, the DV-CPE monitors for dial tone from both the ILEC. Where the ILEC fails to provide a dial tone, the DV-CPE allows the CLEC to provide a dial tone to the telephone 114. As described above, while the ILEC as not terminated voice telephony service to the client premise, the ILEC and serves as a primary voice telephony service provider and the CLEC serves as a secondary voice telephony service provider. Once the ILEC terminates voice telephony service to the client premise, the CLEC and serves as a primary voice telephony service provider and the ILEC serves as a secondary voice telephony service provider.

At step 508, the actual cut over occurs. The LNP from the ILEC to the CLEC occurs and the ILEC cuts off voice telephony service between the client premise and the ILEC switch. Preferably, the LNP occurs prior to the cut off of voice telephony service by the ILEC. During the time period, if any, after the LNP and prior to the cut off of voice telephony service by the ILEC, incoming calls to the telephone number would be routed to the telephone via the ILEC loop while the dial tone as well as the outgoing call services would be provided by the CLEC. Alternatively, if the cut off of the voice telephony service by the ILEC occurs prior to the LNP, then the dial tone and outgoing call services would be provided by the CLEC while neither the ILEC nor the CLEC would be able to connect incoming calls to the telephone at the client premise.

After both the cut off of the voice telephony service by the ILEC and the LNP are complete, the CLEC becomes the primary telephony service provider to the client premise. Thus, at step 510, both incoming and outgoing telephone calls are received and sent via the modified DV-CPE through the CLEC. This step is similar to the conventional CLEC voice telephony service. In other words, the modified DV-CPE allows the CLEC to act as the primary telephony service provide after the cut over, i.e., after the LNP from the ILEC to the CLEC and after the disconnection from the ILEC switch are complete.

The modified DV-CPE preferably can switch from an ILEC-as-primary mode to a CLEC-as-primary mode. For example, the modified DV-CPE may be configured to automatically switch to a CLEC-as-primary mode after both an incoming call and a dial tone are routed through the CLEC. Alternatively, the modified DV-CPE may distinguish between the CLEC-as-primary-for-dial tone and CLEC-as-primary-for-incoming. In such a case, the modified DV-CPE may switch to the CLEC-as-primary-for-dial tone mode upon the first time the CLEC, rather than the ILEC, provides the dial tone to the telephone. In addition, the modified DV-CPE may switch to the CLEC-as-primary-for-incoming mode upon the first time an incoming call is routed to the telephone through the CLEC.

Alternatively, the CLEC switch may send a signal to the modified DV-CPE over the DSL loop to switch the modified DV-CPE from the ILEC-as-primary mode to the CLEC-as-primary mode. The CLEC switch may send the mode switch signal after both an incoming call and a dial tone are routed through the CLEC.

Figure 6:
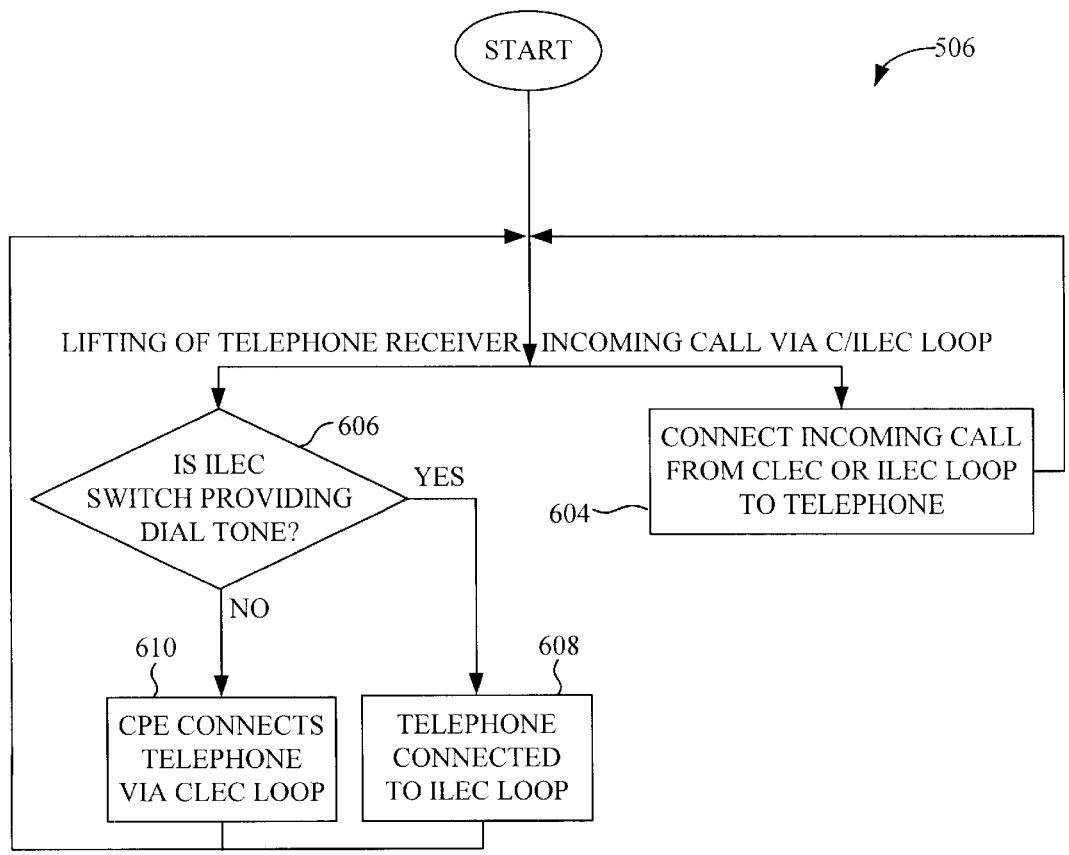
FIG. 6 is a flow chart illustrating a process executed by the derived voice CPE during the switch over process in order to provide uninterrupted transfer of voice telephony service during the switch over.

FIG. 6 is a flow chart illustrating in more detail step 506. First, either a transition to the off-hook state, e.g. by the lifting of the telephone receiver or an incoming call routed by the CLEC or ILEC occurs. If there is an incoming call, the incoming call from the CLEC or ILEC loop is connected to the telephone at step 604.

Alternatively, if the telephone is taken off hook when no call is currently connected, i.e. a dial tone is expected on the receiver end, the modified DV-CPE determines if the ILEC switch is providing a dial tone within a predetermined time period at step 606. As an example, the predetermined time period may be approximately 0.5 seconds. If it is determined that the ILEC is providing dial tone, then at step 608, the telephone is connected to the ILEC loop for provision of telephony service. Alternatively, if it is determined that the ILEC is not providing dial tone, then at step 610, the modified DV-CPE connects the telephone to the CLEC loop and provides dial tone and telephony service via the CLEC loop.

After the modified DV-CPE connects the incoming call to the telephone at step 604 or connects the telephone to the ILEC or CLEC loop for dial tone and telephony service at step 608 or 610, the process then returns to await another incoming telephone call or await the transition of the telephone to the off-hook state.

The process 506 is performed until the ILEC cuts off telephony service to the client premise in step 508. After the cut over is complete, at step 510, the modified DV-CPE continues to execute a process similar to step 506 but with the CLEC as the primary or only service provider. Once the ILEC is no longer serving as the primary voice telephony service provider, the modified DV-CPE may provide dial tone via the CLEC loop by default, i.e. CLEC is primary, upon the detection of the off-hook state for the telephone.

As noted above, where the new telephony service is provided by the CLEC using the same telephone number but over a different twisted pair copper lines as that which carried the original ILEC loop, there must be coordination between the client side wire cross connect and the LNP from the ILEC to the CLEC when the conventional method is used in order to prevent interruptions in telephony service. However, with the modified DV-CPE connected to both the original twisted pair copper wiring and the new twisted pair copper wiring as described above, a single telephone may be connected to both twisted pairs of copper wiring. With such the modified DV-CPE connected in such a way, the client would suffer from fewer or no interruption in voice telephony service during the cut over process.

The above-described embodiments of voice telephony service deployment using modified derived voice CPE enable CLECs to transfer voice telephony service in a transparent manner without service interruption to the client. Such capability provides operational advantage for CLECs that deploy telephony services and enables CLECs to easily deploy wide-spread derived voice telephony services, such as voice over DSL or voice over IP telephony services.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A system for providing uninterrupted voice telephony service during a cut over from telephony service provided by a first local exchange carrier to telephony service provided by a second local exchange carrier, comprising:
    a first telephone line configured to connect to a first voice switch of the first local exchange carrier having an assigned telephone number;
    a second telephone line configured to connect to a second voice switch of the second local exchange carrier having the assigned telephone number; and
    a derived voice customer premise equipment configured to connect to the first telephone line and to the second telephone line, said derived voice customer premise equipment is further configured to detect an off-hook state of a telephone and, upon detecting the off-hook state, detect a dial tone provided to the telephone and to selectively connect the telephone to the second voice switch; and
    wherein said derived voice customer premise equipment is further configured to detect a dial tone provided to the telephone upon detection of the off-hook state of the telephone.

2. The system for providing uninterrupted voice telephony service of claim 1, further comprising a splitter coupled to said derived voice customer premise equipment, said telephone, and said first telephone line.

3. The system for providing uninterrupted voice telephony service of claim 1, wherein said derived voice customer premise equipment is further configured to connect the telephone to the second voice switch carrying an incoming telephone call for receipt of the incoming telephone call by the telephone.

4. The system for providing uninterrupted voice telephony service of claim 1, wherein said derived voice customer premise equipment is further configured to disconnect the telephone from the second voice switch upon said detection of the dial tone provided to the telephone.

5. The system for providing uninterrupted voice telephony service of claim 1, wherein said derived voice customer premise equipment is further configured to connect the telephone to the second voice switch in absence of dial tone provided to the telephone.

6. The system for providing uninterrupted voice telephony service of claim 5, wherein said derived voice customer premise equipment is further configured to determine non-provision of dial tone upon detection of absence of dial tone provided to the telephone for a predetermined period of time.

7. The system for providing uninterrupted voice telephony service of claim 1, wherein said first telephone line is over a first twisted pair copper wiring and said second telephone line is over a second twisted pair copper wiring different from said first twisted pair copper wiring.

8. The system for providing uninterrupted voice telephony service of claim 1, wherein the connection between the telephone and the first voice switch utilizes base-band analog technology and the connection between the telephone and the second voice switch utilizes derived voice technology.

9. A method for providing uninterrupted voice telephony service during a cut over from telephony service provided by a first local exchange carrier to telephony service provided by a second local exchange carrier, comprising:
  establishing connectivity between a telephone and a first voice switch of the first local exchange carrier via a first line having an assigned telephone number;
  establishing connectivity between said telephone and a second voice switch of the second local exchange carrier via a second line having said assigned telephone number;
  detecting an off-hook state of the telephone by a client premise equipment;
  awaiting for a dial tone provided to the telephone by the first voice switch upon said detecting; and
  selectively connecting said telephone to said second voice switch via the client premise equipment; and
  wherein said derived voice customer premise equipment is further configured to detect a dial tone provided to the telephone upon detection of the off-hook state of the telephone.

10. The method for providing uninterrupted voice telephony service of claim 9, wherein said establishing connectivity with said first voice switch is prior to said establishing connectivity with said second voice switch.

11. The method for providing uninterrupted voice telephony service of claim 9, further comprising:
  detecting an incoming telephone call through the second voice switch by said client premise equipment; and
  connecting the telephone to the second voice switch carrying the incoming telephone call via said client premise equipment.

12. The method for providing uninterrupted voice telephony service of claim 11, further comprising:
  determining non-provision of dial tone to the telephone by the first voice switch upon an absence of dial tone after said awaiting for a predetermined period of time by said client premise equipment; and
  connecting the telephone to the second voice switch via said client premise equipment upon said determining.

13. The method for providing uninterrupted voice telephony service of claim 9, wherein said establishing connectivity between said telephone and said first voice switch of the first local exchange carrier via said first line is over a first pair of wiring and said establishing connectivity between said telephone and said second voice switch of the second local exchange carrier via said second line is over a second pair of wiring different from said first pair of wiring.

14. The method for providing uninterrupted voice telephony service of claim 9, wherein said establishing connectivity between said telephone and said first voice switch utilizes base-band analog technology and said establishing connectivity from said telephone to said second voice switch utilizes derived voice technology.

15. A method for cutting over from telephony service provided by a first local exchange carrier to telephony service provided by a second local exchange carrier, comprising:
  connecting a derived voice customer premise equipment to a first line coupled to a first voice switch of the first local exchange carrier;
  connecting the derived voice customer premise equipment to a second line coupled to a second voice switch of the second local exchange carrier;
  disconnecting telephony service from the first local exchange carrier;
  detecting an off-hook state of the telephone by said derived voice customer premise equipment; and
  awaiting a dial tone provided to the telephone by the first voice switch upon said connecting by said derived voice customer premise equipment,
  wherein said derived voice customer premise equipment is configured to selectively connect the telephone to said second voice switch prior to said disconnecting and wherein said derived voice customer premise equipment connects the telephone to said second voice switch after said disconnecting;
  wherein said derived voice customer premise equipment is further configured to detect a dial tone provided to the telephone upon detection of the off-hook state of the telephone.

16. A method for providing uninterrupted voice telephony service according to claim 15, wherein said connecting to the first voice switch utilizes base-band analog technology and said connecting to the second voice switch utilizes derived voice technology.

17. A method for providing uninterrupted voice telephony service according to claim 15, further comprising:
  determining by said derived voice customer premise equipment non-provision of dial tone to the telephone by the first voice switch upon an absence of dial tone after said awaiting for a predetermined period of time; and
  connecting the telephone to the second voice switch upon said determining by said derived voice customer premise equipment.

* * * * *